(12) United States Patent
Mege et al.

(10) Patent No.: US 7,310,378 B2
(45) Date of Patent: Dec. 18, 2007

(54) ESTIMATING A TRANSMISSION CHANNEL WITH PILOT SYMBOLS DISTRIBUTED IN LATTICE STRUCTURE

(75) Inventors: Philippe Mege, Bourg-la-Reine (FR); Christophe Brutel, Paris (FR)

(73) Assignee: Eads Secure Networks, Montigny-le-Bretonneux (FR)

( * ) Notice: Subject to any disclaimer, the term of this patent is extended or adjusted under 35 U.S.C. 154(b) by 576 days.

(21) Appl. No.: 10/493,324

(22) PCT Filed: Oct. 18, 2002

(86) PCT No.: PCT/FR02/03578

§ 371 (c)(1),
(2), (4) Date: Jun. 2, 2004

(87) PCT Pub. No.: WO03/036898

PCT Pub. Date: May 1, 2003

(65) Prior Publication Data

US 2004/0246886 A1    Dec. 9, 2004

(30) Foreign Application Priority Data

Oct. 23, 2001  (FR) .................................. 01 13662

(51) Int. Cl.
*H04J 11/00* (2006.01)
*H04N 11/02* (2006.01)

(52) U.S. Cl. ............... 375/240.27; 375/260; 370/206; 370/208; 455/701; 455/702; 455/59; 455/267

(58) Field of Classification Search .............................. 375/240.26–240.27, 260, 285, 296, 338, 375/346–349; 370/203–204, 206, 208; 455/701–703, 455/59, 63.1, 67.13, 114.2, 267, 296
See application file for complete search history.

(56) References Cited

U.S. PATENT DOCUMENTS 5,274,629 A    12/1993    Helard et al. ................. 370/50

(Continued)

FOREIGN PATENT DOCUMENTS

EP    0 441 731    8/1991

(Continued)

OTHER PUBLICATIONS

Floch et al., "Coded Orthogonal Frequency Division Multiplex", *Proceedings of the IEEE*, vol. 83, No. 6, Jun. 1995.

(Continued)

*Primary Examiner*—David C. Payne
*Assistant Examiner*—Linda Wong
(74) *Attorney, Agent, or Firm*—McCracken & Frank LLP (57) ABSTRACT

A method for estimating a transmission channel from a multicarrier signal transmitted through said transmission channel, comprising real pilot symbols and so-called pure imaginary pilot symbols, consists in selecting one or several values $z_k$ of the received signal corresponding respectively to one or several real pilot symbols, and one or several values $z_l$ of the received signal corresponding respectively to one or several pure imaginary pilot symbols. The pilot symbols are sufficiently close both in frequency and in time such that it can be assumed that the fading of the signal through the transmission channel has a complex value $\alpha$ substantially identical for the symbols. An estimated value $\hat{\alpha}$ of $\alpha$ for the pilot symbols concerned is then determined by minimizing a least square equation involving the values $z_k$ and the values $z_l$.

13 Claims, 3 Drawing Sheets

U.S. PATENT DOCUMENTS

| | | | |
|---|---|---|---|
| 5,963,592 A * | 10/1999 | Kim | 375/232 |
| 6,640,088 B2 * | 10/2003 | Thomas et al. | 455/67.11 |
| 6,990,153 B1 * | 1/2006 | Farhang-Boroujeni et al. | 375/260 |
| 2003/0043927 A1 * | 3/2003 | Suzuki | 375/260 |
| 2004/0141548 A1 * | 7/2004 | Shattil | 375/146 |
| 2004/0252629 A1 * | 12/2004 | Hasegawa et al. | 370/208 |

FOREIGN PATENT DOCUMENTS

EP  0 734 132  9/1996

OTHER PUBLICATIONS

International Search Report dated Feb. 3, 2003, Appl. No. PCT/FR02/03578.

* cited by examiner

ESTIMATING A TRANSMISSION CHANNEL WITH PILOT SYMBOLS DISTRIBUTED IN LATTICE STRUCTURE

TECHNICAL FIELD

The present invention relates to a method of estimating a transmission channel, and to devices for the implementation of the method.

It concerns the field of digital transmissions by radiofrequency carrier waves (digital radio transmissions). It finds applications in particular in receivers of systems for digital radiocommunications with mobiles, for example professional radio-communications systems (PMR systems, the abbreviation standing for "Professional Mobile Radio").

BACKGROUND OF THE INVENTION

In these systems, the digital data are transmitted by modulation of a radiofrequency carrier wave. Stated otherwise, a radio signal is sent over the transmission channel, this signal being modulated so as to carry the digital information to be transmitted.

The expression "estimating the transmission channel" is understood to mean in a conventional manner estimating the conditions of propagation of the radio signal through the latter, which affect the signal transmitted.

One seeks to implement modulation techniques that offer better resistance with regard to disturbances undergone by the radio signal during its transmission through the transmission channel. In essence, these disturbances originate:

- on the one hand from the fading phenomenon, which is frequency selective as soon as the coherence band is overstepped (one speaks in this first case of selective fading), but which is not frequency selective once the width of the channel is less than the coherence band (one speaks in this latter case of flat fading). This fading phenomenon is due to the propagation multipaths which give rise to intersymbol interference (ISI) also known as intersymbol distortion;
- on the other hand, from the fact that the amplitude and the phase of the or of each of the propagation paths may be static (in the sense that they do not vary in the course of time) or on the contrary dynamic (when the propagation conditions vary in the course of time). In the dynamic case, the frequency of this phenomenon (also called the frequency of the fading) and, more generally, the frequency spectrum of the fading are related to the speed of the mobile and to the carrier frequency of the signal sent. The conventional model adopted for the power spectrum of the fading is described in the work "Microwave Mobile Communications", by William C. Jakes, Jr., published by John Wiley & Sons, 1974, pp. 19-25), and involves the Doppler frequency $f_D$ given by:

$$f_D = \frac{V}{c} \times f_c \qquad (1)$$

where V is the speed of the mobile, c is the speed of light, and $f_c$ is the frequency of the radiofrequency carrier.

There is currently effort to seek to implement a multicarrier modulation called OFDM (standing for "Orthogonal Frequency Division Multiplexing"). This modulation technique has been adopted for the European standard regarding digital audio broadcasting systems (DAB systems, the abbreviation standing for "Digital Audio Broadcasting"). It consists in distributing the data to be transmitted over a set of subcarriers sent in parallel in the radio signal. This results in a flat fading effect in relation to each subcarrier since the bandwidth of each subcarrier is less than the coherence band. Furthermore, it results in a reduction in the sensitivity of transmission in relation to the phenomenon of multipaths.

The signal to be transmitted is constructed on a time/frequency lattice. Such a time/frequency lattice comprises a set of symbols, constituting a two-dimensional space which is defined by a frequency axis and by a time axis. It is recalled that a symbol corresponds to a determined number of information bits, for example 8 bits, which takes a determined value in an ad-hoc alphabet. By convention, the frequency axis is represented vertically and the time axis is represented horizontally. Each symbol is tagged by an index m along the frequency axis, and by an index n along the time axis. By convention, a symbol whose position along the frequency axis is defined by the index m, and whose position along the time axis is defined by the index n is in general denoted $S_{m,n}$. Finally, the spacing between the symbols along the frequency axis is denoted $\gamma_0$. Likewise, the spacing between the symbols along the time axis is denoted $\tau_0$.

If S(t) denotes a signal constructed on such a lattice of symbols, the signal S(t) can be decomposed into the form:

$$S(t) = \sum_{m,n} c_{m,n} \times e^{2\cdot i \cdot m \cdot \gamma_0} \times g(t - n \cdot \tau_0) \qquad (2)$$

where the sign $\Sigma$ designates the summation operation;
where the coefficients $c_{m,n}$ are coefficients corresponding to the value of the symbol $S_{m,n}$; and
where the function g(t) designates the shaping pulse for the modulation.

The signal to be transmitted is structured as frames that are transmitted in succession through the transmission channel. Each frame comprises a number M of adjacent subcarriers inside a channel of determined spectral width, each of these subcarriers being divided into N time intervals, called symbol times, which are transmitted in succession through the transmission channel. The duration of a symbol time corresponds to the duration of transmission of a symbol. A frame of the signal therefore comprises M×N symbols. The aforesaid parameter $\gamma_0$ represents the spacing between two adjacent subcarriers, and the aforesaid parameter $\tau_0$ represents the spacing between two successive symbols on one and the same subcarrier.

In systems using OFDM type modulation, the shaping pulses for the modulation are chosen in such a way that each symbol is orthogonal with all the other symbols. The lattice is then said to be orthogonal. By definition, symbols are mutually orthogonal if their scalar product is zero.

This characteristic makes it possible to simplify demodulation.

Systems using OFDM modulation subdivide into two categories.

On the one hand, the systems using a time/frequency lattice of density 1 (subsequently referred to as "systems of density 1", for short) for which the product $\gamma_0 \times \tau_0$ is equal to unity ($\gamma_0 \times \tau_0 = 1$). In these systems the modulated symbols may be complex symbols. The aforesaid coefficients $c_{m,n}$ are then complex numbers. We can write $c_{m,n} = a_{m,n} + i \times b_{m,n}$, where $a_{m,n}$ and $b_{m,n}$ are real numbers. This offers the possibility of employing both amplitude modulation and phase modulation. In practice, a guard must however be taken in the frequency domain and/or in the time domain between two consecutive adjacent symbols along the frequency axis, respectively along the time axis. This guard substantially reduces the maximum throughput (expressed as a number of symbols per second, or baud) which may flow through the transmission channel.

On the other hand, systems using a time/frequency lattice of density 2 (subsequently referred to as "systems of density 2", for short) for which the product $\gamma_0 \times \tau_0$ is equal to $$\frac{1}{2}\left(\gamma_0 \times \tau_0 = \frac{1}{2}\right).$$

In these systems, the maximum throughput (expressed as a number of symbols per second, or baud) is twice as high as in the systems of density 1. However, in systems of density 2, the modulated symbols must be one-dimensional, that is to say they either have a real value (one then speaks of real symbols), or a pure imaginary value (one then speaks of pure imaginary symbols). We can write $c_{m,n} = a_{m,n}$ for the real symbols or $c_{m,n} = i \times b_{m,n}$ for the pure imaginary symbols, where $a_{m,n}$ and $b_{m,n}$ are real numbers. More precisely, if a symbol is real, its immediate neighbors, that is to say the symbols situated on the same subcarrier in the immediately previous and immediately subsequent symbol times (with reference to the order of sending of the symbols over the transmission channel, that is to say the symbols that are adjacent in the direction of the time axis) and the symbols that are situated in the same symbol time on the subcarriers placed on the immediately higher and immediately lower frequencies (i.e., the symbols that are adjacent in the direction of the frequency axis), are pure imaginary. Conversely, if a symbol is pure imaginary, its immediate neighbors, that is to say the symbols adjacent in the direction of the frequency axis and the symbols adjacent in the direction of the time axis, are real. Systems of density 2 do not require the presence of a frequency guard or time guard. They therefore make it possible to transport a higher throughput than systems of density 1.

In what follows, only the case of systems of density 2 will be considered. The invention applies in fact to systems of this type.

A particular example of an OFDM type modulation in a system of density 2 is so-called OFDM/IOTA modulation (the initials standing for "OFDM/Isotropic Orthogonal Transform Algorithm"). The way in which a time/frequency lattice that is orthogonal with such a modulation can be defined is described for example in the article "Coded Orthogonal Frequency Division Multiplex", Bernard L E FLOCH et al., Proceedings of the IEEE, Vol. 83, No. 6, June 1995).

The coefficients $c_{m,n}$ are then either real numbers or pure imaginary numbers, depending on the placement of the symbol $S_{m,n}$ in the frame. They are therefore always one-dimensional. This offers only the possibility of amplitude modulation. Nevertheless, it is not necessary to guarantee a guard time between the symbols or between the subcarriers, this having the advantage of increasing the transmission throughput.

Therefore, half the symbols transmitted are real and half are pure imaginary. These symbols are shaped by the modulation pulse g(t) mentioned earlier. This pulse extends over the time axis, over a duration corresponding to several symbols, and/or over the frequency axis, over frequencies corresponding to several subcarriers.

On receipt of a radio signal, a time and frequency synchronization of the signal received is performed. The signal received is then correlated with the signal expected, that is to say a correlation of the signal received with the modulation pulse g(t) is performed. This correlation may be performed by various procedures, for example by performing a multiplication by the modulation pulse g(t) then an FFT (standing for "Fast Fourier Transform").

Thereafter it is appropriate to proceed with the estimation of the propagation conditions over the transmission channel, that is to say the estimation of the transmission channel, also called estimation of fading since it produces an estimated value of the fading of the signal transmitted through the transmission channel. Specifically, these propagation conditions have to be taken into account when demodulating the signal received, and more precisely when estimating the value of the symbols transmitted.

SUMMARY OF THE INVENTION

The present invention proposes a channel estimating procedure appropriate for system of density 2, that is to say systems using OFDM modulation based on a time/frequency lattice of density 2.

According to a first aspect of the invention, there is in fact proposed a method of estimating a transmission channel on the basis of a signal received after transmission through said transmission channel, said signal being a multicarrier signal constructed on a time/frequency lattice defined by a frequency axis and a time axis, and comprising frames having M×N symbols distributed over M subcarriers each of which is divided into N determined symbol times, each frame comprising P pilot symbols distributed timewise and frequencywise in such a way as to cover the frame according to a lattice structure, where the numbers M, N and P are nonzero integers, the pilot symbols comprising on the one hand symbols known as real pilot symbols, transmitted as symbols having a real value, and on the other hand symbols known as pure imaginary pilot symbols, transmitted as symbols having a pure imaginary value, the method comprising the steps consisting in:

a) selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical (in modulus and in phase) complex value α for these pilot symbols;

b) determining complex numbers u and v and a real number λ by minimizing the following least squares expression:

$$\varepsilon_1^2 = \sum_k \|\mathrm{Re}(z_k \cdot u) - \lambda \cdot c_k\|^2 + \sum_l \|\mathrm{Re}(z_l \cdot v) - \lambda \cdot c_l\|^2$$

where the sign Σ denotes the summation operator, where ‖x‖ denotes the absolute value operator for the real variable x or the modulus of the complex variable x, where Re(w) denotes the real part operator for the complex number w, where λ is a real number, and where u and v are orthogonal (that is to say Re(u*.v)=0, where w* denotes the complex conjugate of the complex number w), such that ∥u∥=∥v∥, c) determining an estimated value $\hat{\alpha}$ of the value a of the fading of the signal through the transmission channel for the pilot symbols concerned, by calculating:

$$\hat{\alpha}=\lambda/u.$$

The invention therefore makes it possible to estimate values of the fading in a system of dimension 2. The steps of the method are repeated by selecting other pairs or groups of pilot symbols, in such a way as to produce sufficiently many estimated values of the fading to allow channel tracking.

According to a second aspect of the invention, there is also proposed a device comprising means for the implementation of this method.

The device comprises:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical (in modulus and in phase) complex value α for these pilot symbols;

means for determining complex numbers u and v and the real number λ minimizing the following least squares expression:

$$\varepsilon_1^2 = \sum_k \|\text{Re}(z_k \cdot u) - \lambda \cdot c_k\|^2 + \sum_l \|\text{Re}(z_l \cdot v) - \lambda \cdot c_l\|^2$$

where the sign Σ denotes the summation operator, where ∥x∥ denotes the absolute value operator for the real variable x where u and v are orthogonal (that is to say such that Re(u*.v)=0) such that ∥u∥=∥v∥, and where λ is a real number, and means for determining an estimated value $\hat{\alpha}$ of the fading of the signal through the transmission channel for the pilot symbols concerned, by calculating:

$$\hat{\alpha}=\lambda/u.$$

According to a first mode of implementation of the method, λ is equal to unity, u is equal to β, and v is equal to −i∼β, where β denotes the inverse of α, so that step b) consists in determining real numbers Re(β) and Im(β) which minimize the following least squares expression:

$$\varepsilon_2^2 = \sum_k \|\text{Re}(z_k \cdot \beta) - c_k\|^2 + \sum_l \|\text{Im}(z_1 \cdot \beta) - c_1\|^2$$

where the sign Σ denotes the summation operator, where ∥x∥ denotes the absolute value operator for the real variable x where Re(x) denotes the real part operator for the complex variable x, and where Im(x) denotes the imaginary part operator for the complex variable x;

and so that step c) consists in determining the estimated value $\hat{\alpha}$ of the value α of the fading of the signal through the transmission channel for the pilot symbols concerned, by inverting the complex number Re(β)+i·Im(β).

According to a third aspect of the invention, there is also proposed a device for the implementation of the method in accordance with this first mode of implementation.

The device comprises:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical complex value α for these pilot symbols;

means for determining real numbers Re(β) and Im(β) minimizing the following least squares expression:

$$\varepsilon_2^2 = \sum_k \|\text{Re}(z_k \cdot \beta) - c_k\|^2 + \sum_l \|\text{Im}(z_1 \cdot \beta) - c_1\|^2$$

where the sign Σ denotes the summation operator, where ∥x∥ denotes the absolute value operator for the real variable x where Re(x) denotes the real part operator for the complex variable x, where Im(x) denotes the pure imaginary part operator for the complex variable x, and where β denotes the inverse of α; and, means for determining an estimated value $\hat{\alpha}$ of the fading of the signal through the transmission channel for the pilot symbols concerned, by inverting the complex number Re(β)+i·Im(β).

According to a second mode of implementation of the method, which constitutes a preferred mode, λ is equal to ρ, u is equal to $e^{-i\varphi}$, and v is equal to $-i \cdot e^{-i\varphi}$, where ρ and φ are real numbers that respectively denote the modulus and the phase of $\hat{\alpha}$ ($\hat{\alpha}=\rho \cdot e^{i\varphi}$), so that step b) and step c) are carried out jointly and consist in determining an estimated value $\hat{\alpha}$ of the fading of the signal through the transmission channel for the pilot symbols concerned, which value is defined by $\hat{\alpha}=\rho \cdot e^{i\varphi}$ where ρ and φ minimize the following least squares expression:

$$\varepsilon_3^2 = \sum_k \|\text{Re}(z_k \cdot e^{-i\varphi}) - \rho \cdot c_k\|^2 + \sum_l \|\text{Im}(z_1 \cdot e^{-i\varphi}) - \rho \cdot c_1\|^2$$

where the sign Σ denotes the summation operator, where ∥x∥ denotes the absolute value operator for the real variable x where Re(x) denotes the real part operator for the complex variable x, and where Im(x) denotes the pure imaginary part operator for the complex variable x.

This mode of implementation is preferred since it makes it possible to obtain the value of α directly, in the sense that it comprises no final step of inverting a complex number. It is therefore faster.

According to a fourth aspect of the invention, there is finally proposed a device for the implementation of the method in accordance with this second mode of implementation.

The device comprises:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical complex value α for these pilot symbols; and, means for determining an estimated value $\hat{\alpha}$ of the fading of the signal through the transmission channel for the pilot symbols concerned, which value is defined by $\hat{\alpha} = \rho \cdot e^{i\phi}$ where $\rho$ and $\phi$ are real numbers which minimize the following least squares expression:

$$\varepsilon_3^2 = \sum_k \|\text{Re}(z_k \cdot e^{-i\varphi}) - \rho \cdot c_k\|^2 + \sum_l \|\text{Im}(z_l \cdot e^{-i\varphi}) - \rho \cdot c_l\|^2$$

where the sign Σ denotes the summation operator, where ||x|| denotes the absolute value operator for the real variable x where Re(x) denotes the real part operator for the complex variable x, and where Im(x) denotes the pure imaginary part operator for the complex variable x.

BRIEF DESCRIPTION OF THE DRAWINGS in FIG. 1: a chart illustrating a time/frequency lattice on which the signal transmitted over the transmission channel is constructed.

DESCRIPTION OF PREFERRED EMBODIMENTS

Figure 1:
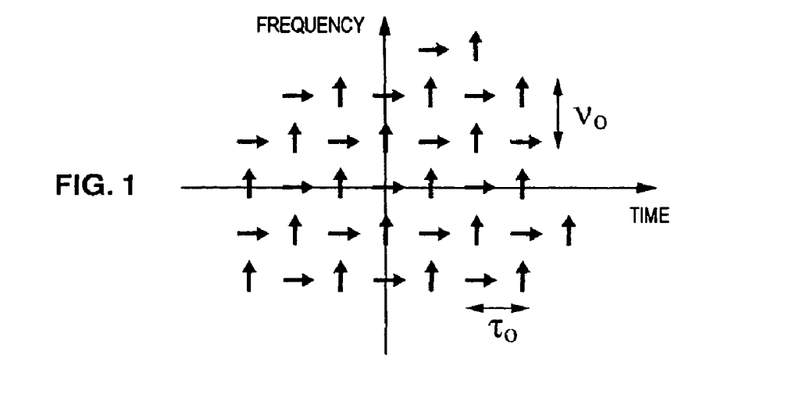

The chart of FIG. 1 illustrates a time/frequency lattice of a system of density 2, such as for example a system using OFDM/IOTA modulation.

The lattice is defined by a frequency axis (here, the vertical axis) and by a time axis (here, the horizontal axis). The lattice comprises a set of symbols represented symbolically here by small horizontal or vertical arrows. The spacing between the symbols along the frequency axis is denoted $\gamma_0$. Likewise, the spacing between the symbols along the time axis is denoted $\tau_0$. According to intrinsic properties of the time/frequency lattice, each symbol is orthogonal with all the other symbols.

In FIG. 1, the symbols represented by horizontal arrows are real symbols. Those represented by vertical arrows are pure imaginary symbols. As stated in the introduction, if a determined symbol is real, its immediate neighbors, that is to say the symbols situated directly to its right or to its left in the direction of the time axis and the symbols situated directly above or below it in the direction of the frequency axis, are pure imaginary. Conversely, if a determined symbol is pure imaginary, its immediate neighbors (defined in the same manner as above) are real. For example the symbol situated at the intersection of the time axis and the frequency axis (called the useful symbol) is a real symbol.

A multicarrier signal may be constructed on such a time/frequency lattice, by being structured as successive frames transmitted over the transmission channel. A frame is defined along the frequency axis and along the time axis, respectively by a frequency band B, and by a duration D. It comprises M subcarriers, where M is an integer such that $B = M \times \gamma_0$. Moreover, each subcarrier is divided into N symbol times, where N is an integer such that $D = N \times \tau_0$. The frame therefore comprises M×N symbols.

Figure 2:
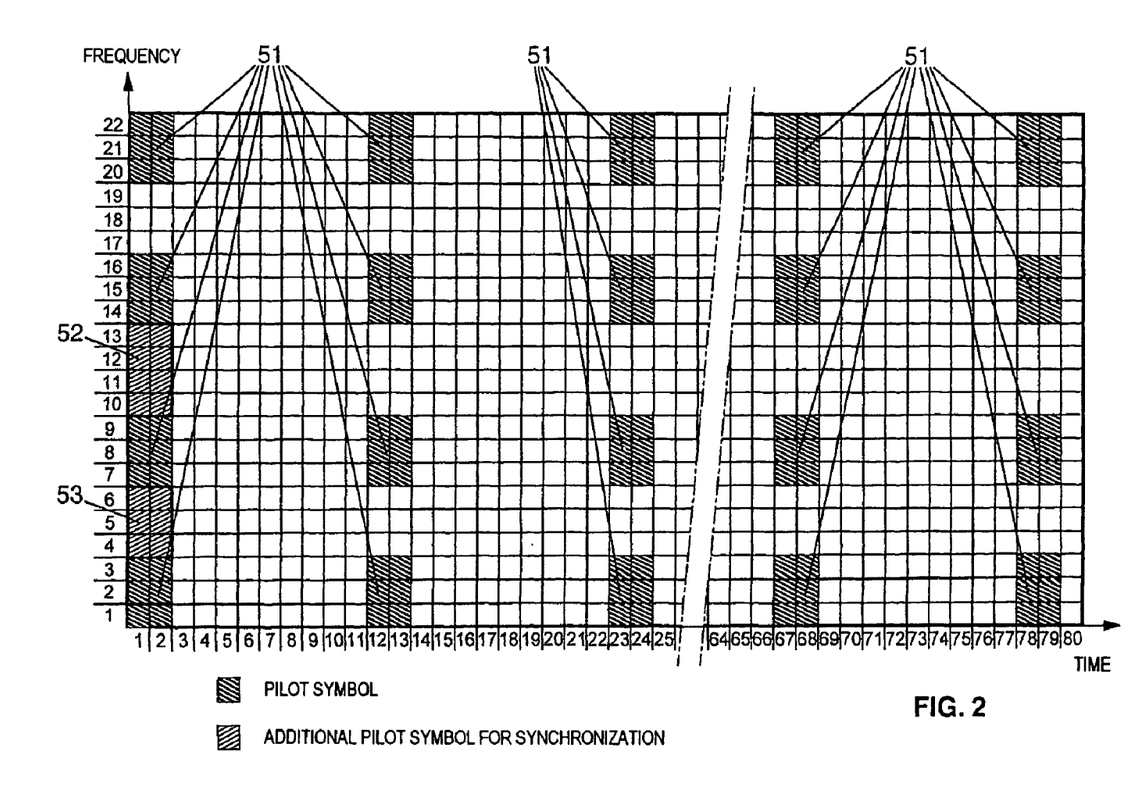
in FIG. 2: a chart illustrating the structure of a frame of a multicarrier signal according to an exemplary embodiment of the invention.

The chart of FIG. 2 represents the structure of a frame of a multicarrer signal according to an example appropriate for the implementation of the invention.

By convention, a double order relation is defined for tagging the location of a symbol in the frame along the frequency axis on the one hand, and along the time axis on the other hand. According to this order relation, the symbol $S_{1,1}$ is the symbol which is carried on the first subcarrier (that corresponding to the index m equal to unity (m=1)) and which is transmitted first on this subcarrier, that is to say which is situated in the first symbol time (that corresponding to the index n equal to unity (n=1)). This symbol $S_{1,1}$ is represented at the bottom left in the figure. Likewise, the symbol $S_{M,N}$ is the symbol which is carried on the last subcarrier of the frame (that corresponding to the index m equal to M (m=M)) and which is transmitted last on this subcarrier, that is to say which is situated in the last symbol time (that corresponding to the index n equal to N (n=N)). This symbol $S_{M,N}$ is represented at the top right in the figure. Generally, the symbol $S_{m,n}$ is the symbol which is carried on the m-th subcarrier of the frame (that of index m) and which is transmitted on this subcarrier in the n-th symbol time (that of index n).

In order to allow channel tracking, the frame contains P pilot symbols, where P is an integer in principle much less than M×N. It is recalled that a pilot symbol is a symbol whose location in the frame and whose value are known to the receiver. The pilot symbols are distributed timewise and frequencywise, in such a way as to cover the frame according to a lattice structure.

In the example represented, the signal occupies a frequency band B=44 kHz (kilohertz) within a radio channel 50 kHz wide. Moreover the spacing between the subcarriers is $\gamma_0$=2 kHz. The frame therefore comprises M=22 subcarriers.

Moreover the duration of the frame is D=20 ms (milliseconds). The throughput over each subcarrier is 4 kilosymbols/s (thousands of symbols per second), hence the temporal spacing between the symbols is $\tau_0$=250 µs. Stated otherwise, the frame comprises N=80 symbol times.

The frame therefore comprises M×N=1760 symbols. In the figure, the pilot symbols are represented by gray cells, and the other symbols, which correspond to useful information, are represented by white cells. Out of the 1760 symbols of the frame, there are 206 symbols that are pilot symbols. Stated otherwise, P=206.

Certain of the pilot symbols, which are pairwise adjacent in the direction of the frequency axis and/or in the direction of the time axis, form a block of pilot symbols such as 51 or 53. In the example, the frame indeed comprises blocks of pilot symbols. A block of pilot symbols is defined in the sense that it is a group of pilot symbols, that may or may not be adjacent in the direction of the frequency axis and/or in the direction of the time axis, and for which a double condition of stationarity in time and stationarity in frequency of the transmission channel is satisfied.

By convention, in what follows, the position of a block of pilot symbols in the frame is tagged by the position of the pilot symbols of this block which is on the carrier of smallest index, and in the symbol time transmitted first (in the figures, this is, for each block, the pilot symbol which is the lowest and the leftmost). Likewise, the size of the block is defined by a dimension along the frequency axis (hereinafter "height", denoted h) expressed as a number of symbols, and by a dimension along the time axis (hereinafter "length", denoted l), expressed as a number of symbols. The size of the block is denoted h×l, where h designates the height and l designates the length of the block.

This convention is convenient in cases where the blocks of pilot symbols have regular dimensions (forming not examples of rows, or of patches of pilot symbols, that is to say squares or rectangles), as is the case in the example represented. Nevertheless, it is understood that a block of pilot symbols may have an irregular structure (for example three pilot symbols that are pairwise adjacent but not aligned).

Furthermore, it is specified that the concept of block of pilot symbols according to the invention does not necessarily correspond to a concept of adjacency but rather to a concept of proximity both in the direction of the frequency axis and in the direction of the time axis. In reality, the definition of a block of pilot symbols is as follows: the pilot symbols of one and the same block, which may or may not be adjacent, are considered to be symbols satisfying a double condition of frequency stationarity and of time stationarity of the conditions of propagation over the transmission channel.

These two conditions may be translated into terms of maximum spacing of the pilot symbols, respectively in the direction of the frequency axis and in the direction of the time axis, as will be made explicit in the next paragraph. As a result, the maximum dimensions of a block of pilot symbols according to the invention depend on the propagation characteristics, the latter therefore having to be taken into account by the system designer when choosing the distribution of the pilot symbols in the frame.

It is known that the characteristics of the propagation through the transmission channel are defined by the maximum frequency of the variations in fading (called the "fading frequency" in the jargon of the person skilled in the art) and the maximum delay between the multipaths. In an example, for propagation of HT ("Hilly Terrain") type which is the most constraining, it has been established that the fading frequency is equal to 148.2 Hz (hertz) for a maximum speed of travel of the mobile equal to 200 km/h (kilometers per hour) and for a carrier frequency equal to 400 MHz (megahertz), on the one hand, and that the maximum delay between the multipaths corresponds to ±7.5 µs (microsecond), i.e. a maximum delay between the most advanced path and the most delayed path of 15 µs, on the other hand.

Now, for a throughput of 4 kilosymbols/s per subcarrier, the frame must comprise pilot symbols (or blocks of pilots) with a spacing in the direction of the time axis, called the temporal spacing, which must be less than the inverse of the fading frequency, that is to say it must comprise a pilot symbol every 27 symbols at most.

This maximum spacing of 27 symbols along the direction of the time axis corresponds to a sampling of the propagation channel (fading) performed faster (even only slightly faster) than the occurrence of the successive fadeouts (zero crossing of the fading on the time axis). Between two successive fadeouts, the phase of the fading has rotated by π (number PI). Over, for example, a tenth of this period between fadeouts, that is to say over a period corresponding to 2.7 successive symbols, the fading will have rotated by π/10. In what follows, a group having two successive symbols along the time axis will be considered for practical reasons. Between these two successive symbols, the fading will have rotated by π/27. If the fading in the middle of this period of two symbols has a certain determined value $F_m$, the fading at the end of this period of two symbols will have a value $F_f$ which will be very close to $F_m \times e^{i\pi/54}$. Hence, we have a quadratic error given by:

$$\epsilon_f^2 = \|F_m - F_f\|^2 = \|F_m\|^2 \times (2 \times \sin(\pi/(2 \times 54)))^2 = \|F_m\|^2 \times 0.00338 \quad (3)$$

i.e. a signal-to-noise ratio of: 24.71 dB.

Likewise if the fading at the start of this period of two symbols has a certain determined value $F_d$, then in the middle of this period we have a quadratic error given by:

$$\epsilon_d^2 = \|F_m - F_d\|^2 = \|F_m\|^2 \times (2 \times \sin(\pi/(2 \times 54)))^2 = \|F_m\|^2 \times 0.00338 \quad (4)$$

i.e. the same signal-to-noise ratio of: 24.71 dB.

Hence, there is no disadvantage in considering the channel to be stationary timewise over a duration corresponding to two successive symbol times, that is to say two adjacent symbols in the direction of the time axis.

Likewise, for propagation of HT type, which exhibits a maximum delay between paths of 15 µs, and for a spacing between subcarriers of 2 kHz, the frame must comprise pilot symbols with a spacing along the frequency axis, called the frequency spacing, which must be less than the inverse of the maximum delay between the multipaths, i.e. one pilot symbol every 33 subcarriers at most.

This spacing of 33 subcarriers along the direction of the frequency axis corresponds to a frequency sampling of the channel more frequently (even only slightly more frequently) than the occurrence of the successive holes in frequency selectivity (zero crossing of the level of the signal received at certain frequencies). Between two successive holes in frequency selectivity the phase of the fading has rotated by π. Over, for example, a tenth of this space between frequency selectivity holes, that is to say over a frequency band corresponding to 3.3 subcarriers, the fading will have rotated by $\pi/10$. A band corresponding to 3 subcarriers will be considered for practical reasons. Between the extreme subcarriers of this band, the fading will have rotated by $(\pi/33) \times 2$. If the fading in the middle of the frequency band comprising these three subcarriers has a certain determined value $F_m$, the fading for the highest frequency subcarrier of this group of three subcarriers will have a value $F_f$ which will be very close to $F_m \times e^{i \cdot \pi/33}$.

Hence, there is a quadratic error given by:

$$\epsilon_f^2 = \|F_m - F_f\|^2 = \|F_m\|^2 \times (2 \times \sin(\pi/(2 \times 33)))^2 = \|F_m\|^2 \times 0.00906 \quad (5)$$

i.e. a signal-to-noise ratio of 20.43 dB.

Likewise if the fading for the lowest frequency subcarrier of this group of three subcarriers has a determined value $F_d$, then in the middle of this period there is a quadratic error given by:

$$\epsilon_d^2 = \|F_m - F_d\|^2 = \|F_m\|^2 \times (2 \times \sin(\pi/(2 \times 33)))^2 = \|F_m\|^2 \times 0.00906 \quad (6)$$

i.e. the same signal-to-noise ratio of 20.43 dB.

Hence, without any disadvantage, the channel may be regarded as frequencywise stationary over a frequency band corresponding to three adjacent subcarriers, that is to say to three adjacent symbols in the direction of the frequency axis.

As a consequence of the foregoing, pilot symbols which are not spaced more than two symbols apart along the time axis or more than three symbols apart along the frequency axis may be regarded as satisfying a double condition of time and frequency stationarity, of the conditions of propagation over the transmission channel (i.e. of the fading).

It will be noted that the considerations regarding the stationarity of the fading set forth hereinabove are to be assessed as a function of the problem to be treated, that is to say in particular of the characteristics of the envisaged propagation, of the speed of the mobile, and of the carrier frequency.

In the general case, this amounts to saying that, as soon as the pilot symbols are sufficiently close together both along the frequency axis and along the time axis, the fading of the signal through the transmission channel may be considered to have a substantially identical complex value for these pilot symbols.

In conclusion, it is thus possible to give the definition of a block of pilot symbols within the sense of the present invention: a block of pilot symbols according to the invention is defined in the sense that it is a group of pilot symbols, that may or may not be adjacent in the direction of the time axis and/or in the direction of the frequency axis, and for which a double condition of time stationarity and of frequency stationarity of the propagation conditions of the transmission channel is satisfied. It will then be possible to make the assumption that the symbols of such a block have been affected by fading having an identical value (in modulus and in phase).

In the example represented in FIG. 2, the frame comprises at least one block of six pilot symbols of dimensions 3×2, that is to say dimensions along the frequency axis and along the time axis correspond respectively to three symbols (h=3) and to two symbols (l=2).

According to the example, the frame comprises more exactly 32 blocks such as 51, of six pilot symbols each, whose dimensions along the frequency axis and along the time axis correspond respectively to three symbols and to two symbols. Their respective locations in the frame, which are tagged by the location of the pilot symbol of the block considered which is in the subcarrier of lowest frequency and in the symbol time transmitted first (i.e., the bottommost and leftmost symbol), are the locations of the symbols $S_{m,n}$ (it is recalled that m and n are integer indices which tag the position of the symbol along the frequency axis and along the time axis respectively), with m lying in the set $\{1, 7, 14, 20\}$ and with $n=1+11 \times j$, where j is an integer lying in the set $[0;7]$.

Furthermore, the frame comprises a first supplementary block 52 of six pilot symbols whose dimensions along the frequency axis and along the time axis correspond respectively to three symbols and to two symbols.

It also comprises a second supplementary block 53 of eight pilot symbols whose dimensions along the frequency axis and along the time axis correspond respectively to four symbols and to two symbols.

The respective locations of the supplementary block 52 and of the supplementary block 53 in the frame, which are tagged by the location of the pilot symbol of the block considered which is in the subcarrier of lowest frequency and in the symbol time transmitted first (i.e., the bottommost and leftmost symbol), are the locations of the symbols $S_{m,n}$ with the pair (m,n) lying in the set of pairs $\{(4,1), (10,1)\}$. Stated otherwise, the blocks 52 and 53 are positioned on the symbols $S_{4,1}$ and $S_{10,1}$ respectively.

The supplementary blocks of pilot symbols 52 and 53, in combination with the blocks 51 which are adjacent to them, are used by the receiver for frame synchronization.

Figure 3:
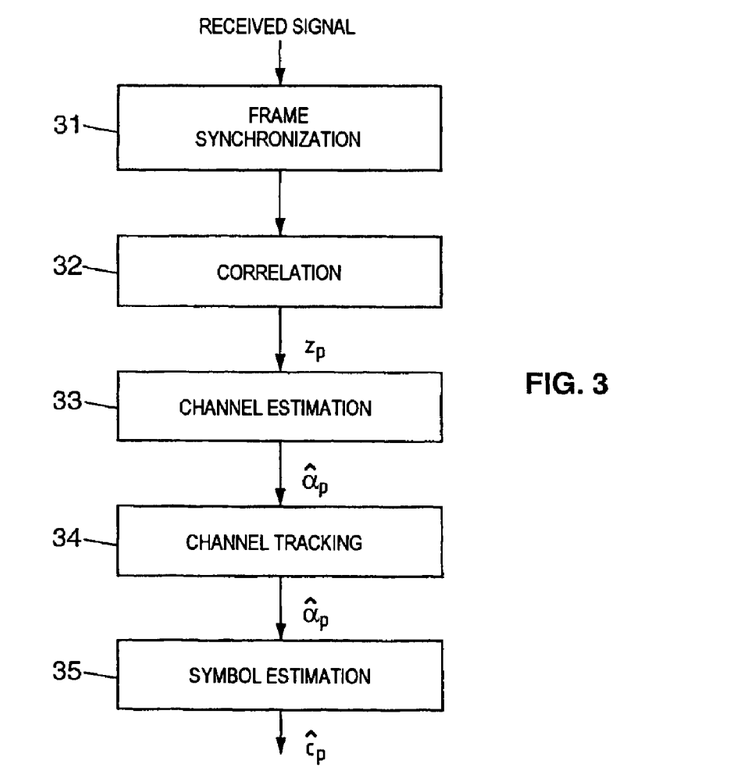
in FIG. 3: a chart illustrating the steps of a method of demodulating a radio signal received by a receiver after transmission through a transmission channel.

Represented in FIG. 3 are the main steps of a demodulation method implemented by a receiver of a digital radiocommunications system.

In a step 31, the receiver performs a time and frequency synchronization of its processing circuits with the frame structure of the signal received. This synchronization is performed by means of the blocks of supplementary pilot symbols 52 and 53 in combination with the blocks of pilot symbols 51 which are adjacent to them in the direction of the frequency axis, as indicated above. The detailed description of this step would depart from the scope of the present account.

In a step 32, and for each symbol transmitted, denoted $S_p$ in what follows (where the index p corresponds to a pair of indices m,n for tagging the position of the symbol in the frame), this signal received is correlated with the expected signal, that is to say a correlation of the signal received with the modulation pulse g(t) is performed. This correlation may be performed by different procedures, for example by performing a multiplication by the modulation pulse g(t) then an FFT.

The signal obtained after this correlation, denoted $z_p$ in what follows and in the figures, may be written in the following manner:

$$z_p = \alpha_p \cdot r_p \quad (7)$$

where $\alpha_p$ and $r_p$ are complex numbers that correspond respectively to the value of the fading and to the interference-affected value of the useful symbol having degraded the symbol in the course of the transmission through the transmission channel.

Owing to the orthogonality property of the symbols, the number $r_p$ in fact comprises the original useful symbol and furthermore an interference term, which originates from interference due to the transmission of the neighboring symbols. This interference is, by construction of OFDM systems of density 2, orthogonal to the original useful symbol.

Thus, if the symbol transmitted $S_p$ was real (i.e. if $c_p$ is a real number equal to $a_p$), we then have:

$$r_p = a_p + i \cdot int_p \quad (8)$$

where the term $i \cdot int_p$ represents the interference and is a pure imaginary number (that is to say the number $int_p$ is a real number).

Conversely, if the symbol transmitted was pure imaginary (i.e. if $c_p$ is a pure imaginary number, equal to $i \cdot b_p$, we then have:

$$r_p = int_p + i \cdot b_p \quad (9)$$

where the term $int_p$ represents the interference and is a real number.

In a step 33, the estimation of the fading is then carried out for each of the pilot symbols contained in the frame. That is to say the conditions of propagation through the transmission channel are estimated for the pilot symbols, whose location in the frame and whose value are known to the receiver in advance.

In a step 34, one then proceeds to what is referred to as the channel tracking. For this purpose, one or more interpolations are performed, on the basis of the estimated values obtained in step 33, so as to produce estimated values of the fading for the other symbols of the frame (symbols corresponding to useful information).

An estimated value, denoted $\hat{\alpha}_p$ in what follows and in the figures, of the fading is thus obtained for each symbol of the frame.

Finally, in a step 35, the symbols transmitted (in particular the symbols other than the pilot symbols, since those are the ones that carry the useful information) are estimated by performing the following calculation for each:

$$\hat{c}_p = z_p / \hat{\alpha}_p \quad (10)$$

The invention relates to step 33 above, by which the fading is estimated for the pilot symbols of the frame. The invention relates in fact to channel estimating methods and devices.

Figure 4A:
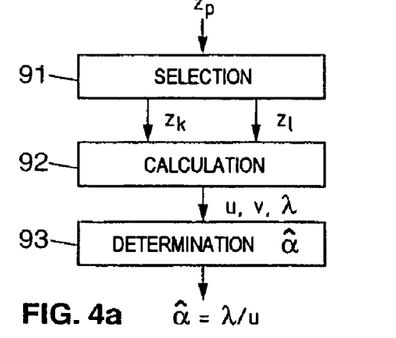
in FIGS. 4a to 4c: charts of steps illustrating the method according to the invention respectively in the general case, according to a first mode of implementation and according to a second mode of implementation.

The diagram of FIG. 4a illustrates the steps of a method according to a first aspect of the invention.

In a step 91, on the one hand K values of the signal received are selected, where K is an integer greater than or equal to unity. The expression signal received is understood here to mean the radio signal received by the receiver, considered after the synchronization step 31 and correlation step 32. The K values thus selected correspond to one or more real pilot symbols $S_k$. These K values are denoted $z_k$, where k is an integer index lying between 1 and K ($1 \leq k \leq K$) of the signal received. Moreover, the respective values of the real pilot symbols $S_k$ transmitted are denoted $c_k$.

Moreover, L values of the signal received (in the sense indicated above) are also selected. These values are denoted $z_l$, and correspond respectively to one or more pure imaginary pilot symbols denoted $S_l$, of respective values denoted $c_l$, where L is an integer greater than or equal to unity and where l is an index lying between 1 and L ($1 \leq l \leq L$).

The pilot symbols $S_k$ and $S_l$ are not picked at random. On the contrary, they are pilot symbols that are sufficiently close together both along the frequency axis and along the time axis for it to be possible for the fading of the signal through the transmission channel to be considered to have had a substantially identical complex value (in modulus and in phase) for these pilot symbols. This complex value is denoted $\alpha$. Moreover, the inverse of this complex number is denoted $\beta$ (that is to say $\beta = 1/\alpha$).

In a step 92, we then determine complex numbers u and v and a real number $\lambda$ which minimize the following least squares expression:

$$\varepsilon_1^2 = \sum_k \| Re(z_k \cdot u) - \lambda \cdot c_k \|^2 + \sum_l \| Re(z_l \cdot v) - \lambda \cdot c_l \|^2 \quad (11)$$

where the sign $\Sigma$ denotes the summation operator, where $\|x\|$ denotes the absolute value operator for the real variable x or the modulus of the complex variable x, where $\lambda$ is a real number, where u and v are orthogonal (that is to say $Re(u^* \cdot v) = 0$, where $Re(x)$ denotes the real part operator for the complex number x, and where $x^*$ denotes the complex conjugate of the complex number x), such that $\|u\| = \|v\|$.

For example, it will be possible to take $v = -i \cdot u$, where i denotes the square root of the relative integer $-1$, that is to say the complex number $e^{-i\pi/2}$.

In a step 93, an estimated value $\hat{\alpha}$ of the value $\alpha$ of the fading of the signal through the transmission channel is determined for the pilot symbols concerned, that is to say for the pilot symbols $S_k$ and $S_l$ selected in step 91, by calculating:

$$\hat{\alpha} = \lambda / u \quad (12)$$

This estimated value $\hat{\alpha}$ holds for the pilot symbols $S_k$ and $S_l$. Of course, steps 91 to 93 are preferably repeated in such a way as to produce estimated values $\hat{\alpha}$ of the value $\alpha$ of the fading of the signal through the transmission channel for all the pilot symbols of the frame, or at least for all those of these pilot symbols that are taken into account for performing the channel tracking (step 34 of FIG. 3).

The least squares expression (11) above will be understood better after the following description of two modes of implementation of the invention, offered below with regard to FIGS. 4b and 4c, of which it constitutes a generalization.

A first mode of implementation is described below with regard to the chart of steps of FIG. 4b.

In this mode of implementation, the method comprises a selection step 41, which is identical to step 91 described above, and steps 42 and 43, which correspond to steps 92 and 93 respectively mentioned above.

Firstly, let us assume that $K = L = 1$. Stated otherwise, let us assume that, in step 41, a single value $z_1$ of the signal received has been selected, corresponding to one and only one real pilot symbol $S_1$ of value $c_1$ on the one hand, and a single value $z_2$ of the signal received has been selected, corresponding to one and only one pure imaginary pilot symbol $S_2$ of value $c_2$ on the other hand.

For the symbol $S_1$ of value $c_1$ transmitted as real symbol, we may write:

$$Re(z_1 \cdot \beta) = c_1 \quad (13)$$

and, for the symbol $S_2$ of value $c_2$ transmitted as pure imaginary symbol, we can also write:

$$Im(z_2 \cdot \beta) = c_2 \quad (14)$$

where $Re(x)$ designates the real part operator for the complex variable x, and where $Im(x)$ denotes the pure imaginary part operator for the complex variable x.

We can therefore form the system of equations:

$$\begin{cases} \mathrm{Re}(z_1 \cdot \beta) - c_1 = 0 \\ \mathrm{Im}(z_2 \cdot \beta) - c_2 = 0 \end{cases} \quad (15)$$

In a calculation step 42, the above system of equations is solved to obtain $\mathrm{Re}(\beta)$ and $\mathrm{Im}(\beta)$. The complex number $\beta = \mathrm{Re}(\beta) + i \cdot \mathrm{Im}(\beta)$ is thus obtained, given by:

$$\beta = \frac{c_1 \cdot z_2^* + c_2 \cdot i \cdot z_1^*}{\mathrm{Re}(z_1 \cdot z_2^*)} \quad (16)$$

where $z_1^*$ and $z_2^*$ designate respectively the complex number defined by the conjugate of $z_1$ and the complex number defined by the conjugate of $z_2$.

This calculation generalizes to other cases, that is to say to the cases where $(K,L) \neq (1,1)$ by assigning the indices k to the pilot symbols (selected in step 41) which were transmitted as real pilot symbols, and the indices l to the pilot symbols (selected in step 41) which were transmitted as pure imaginary symbols.

Step 42 then consist in determining the real numbers $\mathrm{Re}(\beta)$ and $\mathrm{Im}(\beta)$ which minimize the following least squares expression:

$$\varepsilon_2^2 = \sum_k \|\mathrm{Re}(z_k \cdot \beta) - c_k\|^2 + \sum_l \|\mathrm{Im}(z_l \cdot \beta) - c_l\|^2 \quad (17)$$

where the sign $\Sigma$ denotes the summation operator, where $\|x\|$ denotes the absolute value operator for the real variable x.

The least squares expression (17) corresponds to the least squares expression (11) of the general case, putting $\lambda$ equal to unity, u equal to $\beta$, and v equal to $-i \cdot \beta$. Stated otherwise, the first mode of implementation of the method in accordance with the chart of steps of FIG. 4b is deduced from the general case by putting $\lambda$ equal to unity, u equal to $\beta$ and v equal to $-i \cdot \beta$.

The numbers $\mathrm{Re}(\beta)$ and $\mathrm{Im}(\beta)$ sought are those which minimize the following least squares expression:

$$\varepsilon_2^2 = \sum_k \|\mathrm{Re}(z_k) \cdot \mathrm{Re}(\beta) - \mathrm{Im}(z_k) \cdot \mathrm{Im}(\beta) - c_k\|^2 +$$
$$\sum_l \|\mathrm{Re}(z_l) \cdot Im(\beta) + \mathrm{Im}(z_l) \cdot \mathrm{Re}(\beta) - c_l\|^2$$

In an example, step 42 may consist in solving the following system of two equations in two unknowns:

$$\begin{cases} \dfrac{\partial \varepsilon_2^2}{\partial \mathrm{Re}(\beta)} = 0 \\ \dfrac{\partial \varepsilon_2^2}{\partial \mathrm{Im}(\beta)} = 0 \end{cases} \quad (18)$$

It can be shown that, by solving this system of equations, we then obtain:

$$\mathrm{Re}(\beta) = \frac{A \times B \times C \times D}{E \times B - D} \quad (19)$$

on the one hand, and $$\mathrm{Im}(\beta) = \frac{C \times E + A \times D}{E \times B - D} \quad (20)$$

on the other hand, where $A = \sum_k c_k \cdot \mathrm{Re}(z_k) + \sum_l c_l \cdot \mathrm{Im}(z_l)$;

where $B = \sum_k \mathrm{Im}(z_k)^2 + \sum_l \mathrm{Re}(z_l)^2$;

where $C = -\sum_k c_k \cdot \mathrm{Re}(z_k) + \sum_l c_l \cdot \mathrm{Im}(z_l)$;

where $D = \sum_k \mathrm{Re}(z_k) \cdot \mathrm{Im}(z_k) - \sum_l \mathrm{Im}(z_l) \cdot \mathrm{Re}(z_l)$; and where $E = \sum_k \mathrm{Re}(z_k)^2 + \sum_l \mathrm{Im}(z_l)^2$.

The method therefore makes it possible to take into account any number of pilot symbols, and hence to introduce diversity as appropriate. The simplest mode of implementation, and hence the least expensive in computation time, is however, that where only two pilot symbols alone (one of which is a real pilot symbol and one a pure imaginary pilot symbol) are selected in step 41.

In a step 43, an estimated value $\hat{\alpha}$ of the value $\alpha$ of the fading of the signal through the transmission channel is finally determined by inverting the complex number $\mathrm{Re}(\beta) + i \cdot \mathrm{Im}(\beta)$. It can be verified that this step 43 is deduced from the definition of step 93 of the general case given above, with $\lambda$ equal to unity, and u equal to $\beta$.

This estimated value $\hat{\alpha}$ holds for the pilot symbols $S_k$ and $S_l$. Of course, steps 41 to 43 are preferably repeated in such a way as to produce estimated values $\hat{\alpha}$ of the value $\alpha$ of the fading of the signal through the transmission channel for all the pilot symbols of the frame, or at least for all those of these pilot symbols that are taken into account for performing the channel tracking (step 34 of FIG. 3).

Figure 4B:
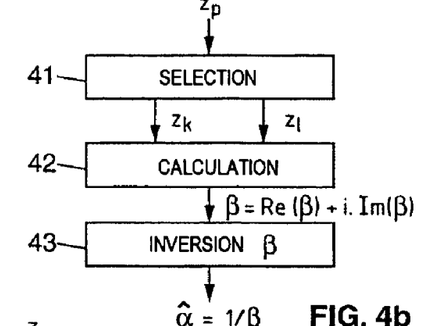
Figure 4C:
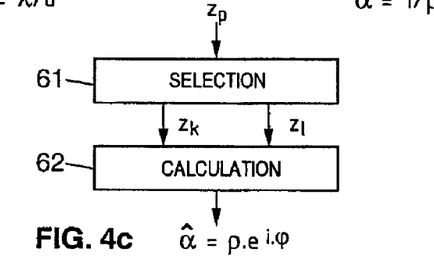

In a second mode of implementation of the method, illustrated by the chart of steps of FIG. 4c, an estimated value $\hat{\alpha}$ of the fading of the signal through the transmission channel can be determined directly.

This mode of implementation comprises a step 61 which is identical to the step 91 described above, and a step 62 which is the equivalent of step 92 described above. Step 62 nevertheless makes it possible to circumvent step 93, which therefore has no equivalent in this mode of implementation.

According to this variant in fact, step 92 is performed by putting $\lambda$ equal to $\rho$, u equal to $e^{-i\varphi}$, and v equal to $-i \cdot e^{-i\varphi}$, where $\rho$ and $\varphi$ are real numbers that designate respectively the modulus and the phase of $\hat{\alpha}$ ($\hat{\alpha} = \rho \cdot e^{i\varphi}$).

Thus step 92 and step 93 are carried out jointly, in a calculation step denoted 62, and consist in determining an estimated value $\hat{\alpha}$ of the fading of the signal through the transmission channel for the pilot symbols concerned, which value is defined by $\hat{\alpha}=\rho \cdot e^{i\varphi}$ where $\rho$ and $\varphi$ minimize the following least squares expression:

$$\varepsilon_3^2 = \sum_k \|\text{Re}(z_k \cdot e^{-i\varphi}) - \rho \cdot c_k\|^2 + \sum_l \|\text{Im}(z_l \cdot e^{-i\varphi}) - \rho \cdot c_l\|^2 \quad (21)$$

where the sign $\Sigma$ denotes the summation operator, where $\|x\|$ denotes the absolute value operator for the real variable x, where Re(x) denotes the real part operator for the complex variable x, and where Im(x) denotes the pure imaginary part operator for the complex variable x.

Stated otherwise, in step 62 an estimated value $\hat{\alpha}$ of the fading of the signal through the transmission channel is determined for the pilot symbols $S_k$ and $S_l$ concerned, which value is defined in polar coordinates by $\hat{\alpha}=\rho \cdot e^{i\varphi}$, where $\rho$ and $\varphi$ are real numbers, whose value is obtained by making these numbers minimize the least squares expression (21) above.

This estimated value $\hat{\alpha}$ holds for the pilot symbols $S_k$ and $S_l$. Of course, steps 61 and 62 are repeated in such a way as to produce estimated values $\hat{\alpha}$ of the value $\alpha$ of the fading of the signal through the transmission channel for all the pilot symbols of the frame, or at least for all those of these pilot symbols that are taken into account for performing the channel tracking (step 34 of FIG. 3).

In an example, step 62 can consist in solving the following system of equations:

$$\begin{cases} \dfrac{\partial \varepsilon_3^2}{\partial \rho} = 0 \\ \dfrac{\partial \varepsilon_3^2}{\partial \varphi} = 0 \end{cases} \quad (22)$$

By matrix calculation, we then obtain an expression for $\tan(\varphi)$ on the one hand, and for $\rho$ in the form of a function of $\varphi$ on the other hand ($\rho=f(\varphi)$).

In the simplest case where, in step 91, the value $z_1$ of the signal received is selected, corresponding to one and only one real pilot symbol of value $c_1$, on the one hand, and the value $z_2$ of the signal received is selected, corresponding to one and only one pure imaginary pilot symbol of value $c_2$ on the other hand, step 62 comprises the solving of the following system with two equations:

$$\begin{cases} \text{Re}(z_1 \cdot e^{-i\varphi}) - \rho \cdot c_1 = 0 \\ \text{Im}(z_2 \cdot e^{-i\varphi}) - \rho \cdot c_2 = 0 \end{cases} \quad (23)$$

The symbols selected in step 91 (in the general case with regard to FIG. 4a), in step 41 (in the first mode of implementation described above with regard to FIG. 4b) or in step 61 (in the second mode of implementation described above with regard to FIG. 4c), may belong to one and the same single frame. Nevertheless, they may also belong to two frames transmitted consecutively through the transmission channel, from the moment that the condition of proximity both in the direction of the frequency axis and in the direction of the time axis, which was defined above, is complied with for these symbols.

This condition is complied with when the pilot symbols $S_k$ and $S_l$ belong to a block of pilot symbols within the sense defined above, such as the blocks 51 of the exemplary frame represented in FIG. 2.

Preferably, the pilot symbols $S_k$ and $S_l$ thus selected belong to a group of pilot symbols that are pairwise adjacent in the frame, in the direction of the frequency axis and/or in the direction of the time axis. This is the case in particular for the pilot symbols belonging to the blocks 51 (whose dimensions are equal to 3×2) of the exemplary frame represented in FIG. 2.

Figure 5:
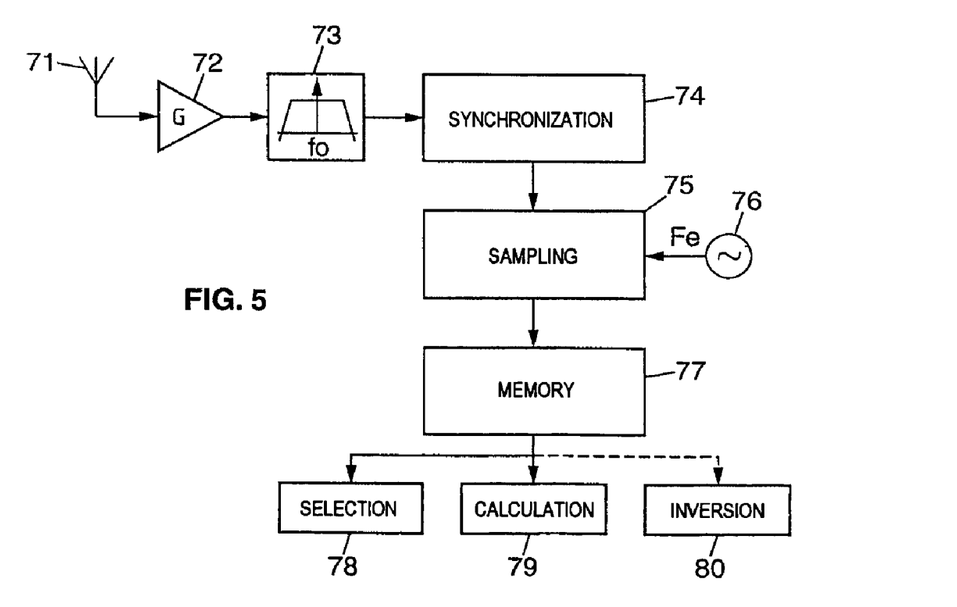
in FIG. 5: a schematic diagram illustrating devices according to the invention.

FIG. 5 shows the diagram of a device according to the invention, appropriate for the implementation of the method described above with regard to FIGS. 4a-4c. The means for executing step 93 of FIG. 4a or step 43 of FIG. 4b being represented by dashes in FIG. 5, insofar as these means of the device do not exist as such in a device for the implementation of the method according to the mode of implementation in accordance with the diagram of FIG. 4c.

The device described is here integrated into a radio receiver, which comprises an antenna 71 for receiving the radio signal transmitted through the transmission channel constituted by the air. The signal picked up by the antenna 71 is amplified by a reception amplifier 72, then filtered by a bandpass filter 73 centered on the frequency band of the radio channel.

The signal thus amplified and filtered is then fed to the input of a synchronization module 74 carrying out the frequency and time synchronization of the signal.

The signal output by the module 74 is transmitted to the input of a sampling module 75, which receives a sampling frequency Fe delivered by an oscillator 76. This module 75 produces the aforesaid values $z_p$. The latter are stored in a memory 77 of the receiver.

The device according to the invention comprises specifically a selection module 78, which performs the selection step 91, 41 or 61, on the basis of the values $z_p$ stored in the memory 77.

It furthermore comprises a calculation module 79, which performs the calculation step 92, 42 or 62 on the basis of the K values $z_k$ and the L values $z_l$ selected by the selection module 78. This module 79 delivers the complex number $\beta$ in the case of the mode of implementation of the method in accordance with FIG. 4b, or the estimated value $\hat{\alpha}$ in the case of the mode of implementation of the method in accordance with FIG. 4c.

For the implementation of the method in the general case in accordance with FIG. 4a, or according to the mode of implementation in accordance with FIG. 4b, the device furthermore comprises an inversion module 80. In the general case, the module 80 inverts the complex number u. According to the mode of implementation in accordance with FIG. 4b, the module 80 inverts the complex number $\beta$ provided by the calculation module 79, so as to deliver the estimated value $\hat{\alpha}$.

The modules 78, 79 and 80 access the memory 77. They may be embodied in the form of software modules, the demodulation means of the receiver included.

The invention claimed is:

1. A method of estimating a transmission channel on the basis of a signal received after transmission through said transmission channel, said signal being a multicarrier signal constructed on a time/frequency lattice defined by a frequency axis and a time axis, and comprising frames having M×N symbols distributed over M subcarriers each of which is divided into N determined symbol times, each frame comprising P pilot symbols distributed timewise and frequencywise in such a way as to cover the frame according to a lattice structure, where the numbers M, N and P are nonzero integers, the pilot symbols comprising on the one hand symbols known as real pilot symbols, transmitted as symbols having a real value, and on the other hand symbols known as pure imaginary pilot symbols, transmitted as symbols having a pure imaginary value, the method comprising the steps of:

a) selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical (in modulus and in phase) complex value $\alpha$ for these pilot symbols;

b) determining complex numbers u and v and a real number $\lambda$ by minimizing the following least squares expression:

$$\varepsilon_1^2 = \sum_k \|\text{Re}(z_k \cdot u) - \lambda \cdot c_k\|^2 + \sum_l \|\text{Re}(z_l \cdot v) - \lambda \cdot c_l\|^2$$

where the sign $\Sigma$ denotes the summation operator,
where $\|x\|$ denotes the absolute value operator for the real variable x or the modulus of the complex variable x,
where $\lambda$ is a real number,
where k is an integer index between 1 and the number of values $z_k$,
where u and v are orthogonal (that is to say $\text{Re}(u^* \cdot v)=0$, where $\text{Re}(w)$ denotes the real part operator for the complex number w, and where $w^*$ denotes the complex conjugate of the complex number w), such that $\|u\|=\|v\|$, c) determining an estimated value $\hat{\alpha}$ of the value $\alpha$ of the fading of the signal through the transmission channel for the pilot symbols concerned, by calculating: $\hat{\alpha}=\lambda/u$.

2. The method of estimating a transmission channel of claim 1, wherein $\lambda$ is equal to unity, u is equal to $\beta$, and v is equal to $-i \cdot \beta$, where $\beta$ denotes the inverse of $\alpha$, wherein step b) consists in determining real numbers $\text{Re}(\beta)$ and $\text{Im}(\beta)$ by minimizing the following least squares expression:

$$\varepsilon_2^2 = \sum_k \|\text{Re}(z_k \cdot \beta) - c_k\|^2 + \sum_l \|\text{Im}(z_l \cdot \beta) - c_l\|^2$$

where the sign $\Sigma$ denotes the summation operator,
where $\|x\|$ denotes the absolute value operator for the real variable x,
where $\text{Re}(x)$ denotes the real part operator for the complex variable x, and
where $\text{Im}(x)$ denotes the imaginary part operator for the complex variable x,
and wherein step c) consists in determining the estimated value $\hat{\alpha}$ of the value $\alpha$ of the fading of the signal through the transmission channel for the pilot symbols concerned, by inverting the complex number $\text{Re}(\beta)+i \cdot \text{Im}(\beta)$.

3. The method of claim 2, wherein step b) comprises the solving of the following system of two equations in two unknowns:

$$\begin{cases} \dfrac{\partial \varepsilon_2^2}{\partial \text{Re}(\beta)} = 0 \\ \dfrac{\partial \varepsilon_2^2}{\partial \text{Im}(\beta)} = 0 \end{cases}.$$

4. The method of claim 2, wherein step a) comprises the selection of the value $z_1$ of the signal received corresponding to one and only one real pilot symbol of value $c_1$ on the one hand, and of the value $z_2$ of the signal received corresponding to one and only one pure imaginary pilot symbol of value $c_2$ on the other hand, and wherein step b) comprises the solving of the following system of equations in two unknowns:

$$\begin{cases} \text{Re}(z_1 \cdot \beta) - c_1 = 0 \\ \text{Im}(z_2 \cdot \beta) - c_2 = 0 \end{cases}.$$

5. The method of claim 1, wherein $\lambda$ is equal to $\rho$, u is equal to $e^{-i\varphi}$, and v is equal to $-i \cdot e^{-i\varphi}$, where $\rho$ and $\varphi$ are real numbers that respectively denote the modulus and the phase of $\hat{\alpha}$ ($\hat{\alpha}=\rho \cdot e^{i\varphi}$, wherein step b) and step c) are carried out jointly and consist in determining an estimated value $\hat{\alpha}$ of the fading of the signal through the transmission channel for the pilot symbols concerned, which value is defined by $\hat{\alpha}=\rho \cdot e^{i\varphi}$ where $\rho$ and $\varphi$ minimize the following least squares expression:

$$\varepsilon_3^2 = \sum_k \|\text{Re}(z_k \cdot e^{-i\varphi}) - \rho \cdot c_k\|^2 + \sum_l \|\text{Im}(z_l \cdot e^{-i\varphi}) - \rho \cdot c_l\|^2$$

where the sign $\Sigma$ denotes the summation operator,
where $\|x\|$ denotes the absolute value operator for the real variable x,
where $\text{Re}(x)$ denotes the real part operator for the complex variable x, and
where $\text{Im}(x)$ denotes the pure imaginary part operator for the complex variable x.

6. The method of claim 5, wherein step b) comprises the solving of the following system of two equations in two unknowns:

$$\begin{cases} \dfrac{\partial \varepsilon_3^2}{\partial \rho} = 0 \\ \dfrac{\partial \varepsilon_3^2}{\partial \varphi} = 0 \end{cases}.$$

7. The method of claim 5, wherein step a) comprises the selection of the value $z_1$ of the signal received corresponding to one and only one real pilot symbol of value $c_1$ on the one hand, and of the value $z_2$ of the signal received corresponding to one and only one pure imaginary pilot symbol of value $c_2$ on the other hand, and wherein step b) comprises the solving of the following system of equations in two unknowns:

$$\begin{cases} \mathrm{Re}(z_1 \cdot e^{-i\varphi}) - \rho \cdot c_1 = 0 \\ \mathrm{Im}(z_2 \cdot e^{-i\varphi}) - \rho \cdot c_2 = 0 \end{cases}.$$

8. The method of claim 1, wherein the symbols selected in step a) belong to one and the same single frame.

9. The method of claim 1, wherein the symbols selected in step a) belong to two frames transmitted consecutively through the transmission channel.

10. The method of claim 1, wherein the symbols selected in step a) belong to a group of pilot symbols that are pairwise adjacent in the frame, in the direction of the frequency axis and/or in the direction of the time axis.

11. A device for estimating a transmission channel on the basis of a signal received after transmission through said transmission channel, said signal being a multicarrier signal constructed on a time/frequency lattice defined by a frequency axis and a time axis, and comprising frames having M×N symbols distributed over M subcarriers each of which is divided into N determined symbol times, each frame comprising P pilot symbols distributed timewise and frequencywise in such a way as to cover the frame according to a lattice structure, where the numbers M, N and P are nonzero integers, the pilot symbols comprising on the one hand symbols known as real pilot symbols, transmitted as symbols having a real value, and on the other hand symbols known as pure imaginary pilot symbols, transmitted as symbols having a pure imaginary value, comprising:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical complex value α for these pilot symbols;

means for determining complex numbers u and v and a real number x minimizing the following least squares expression:

$$\varepsilon_1^2 = \sum_k \|\mathrm{Re}(z_k \cdot u) - \lambda \cdot c_k\|^2 + \sum_l \|\mathrm{Re}(z_l \cdot v) - \lambda \cdot c_l\|^2$$

where the sign Σ denotes the summation operator,
where ∥x∥ denotes the absolute value operator for the real variable x or the modulus of the complex variable x,
where λ is a real number,
where k is an integer index between 1 and the number of values $z_k$,
where u and v are orthogonal (that is to say Re(u*·v)=0, where Re(w) denotes the real part operator for the complex number w, and where w* denotes the complex conjugate of the complex number w), such that ∥u∥=∥v∥,
means for determining an estimated value $\hat{\alpha}$ of the value α of the fading of the signal through the transmission channel for the pilot symbols concerned, by calculating: $\hat{\alpha} = \lambda/u$.

12. A device for estimating a transmission channel on the basis of a signal received after transmission through said transmission channel, said signal being a multicarrier signal constructed on a time/frequency lattice defined by a frequency axis and a time axis, and comprising frames having M×N symbols distributed over M subcarriers each of which is divided into N determined symbol times, each frame comprising P pilot symbols distributed timewise and frequencywise in such a way as to cover the frame according to a lattice structure, where the numbers M, N and P are nonzero integers, the pilot symbols comprising on the one hand symbols known as real pilot symbols, transmitted as symbols having a real value, and on the other hand symbols known as pure imaginary pilot symbols, transmitted as symbols having a pure imaginary value, comprising:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical complex value α for these pilot symbols;

means for determining real numbers Re(β) and Im(β) minimizing the following least squares expression:

$$\varepsilon_2^2 = \sum_k \|\mathrm{Re}(z_k \cdot \beta) - c_k\|^2 + \sum_l \|\mathrm{Im}(z_l \cdot \beta) - c_l\|^2$$

where the sign Σ denotes the summation operator,
where ∥x∥ denotes the absolute value operator for the real variable x,
where k is an integer index between 1 and the number of values $z_k$,
where Re(x) denotes the real part operator for the complex variable x,
where Im(x) denotes the pure imaginary part operator for the complex variable x, and
where β denotes the inverse of α; and,
means for determining an estimated value $\hat{\alpha}$ of the fading of the signal through the transmission channel for the pilot symbols concerned, by inverting the complex number Re(β)+i·Im(β).

13. A device for estimating a transmission channel on the basis of a signal received after transmission through said transmission channel, said signal being a multicarrier signal constructed on a time/frequency lattice defined by a frequency axis and a time axis, and comprising frames having M×N symbols distributed over M subcarriers each of which is divided into N determined symbol times, each frame comprising P pilot symbols distributed timewise and frequencywise in such a way as to cover the frame according to a lattice structure, where the numbers M, N and P are nonzero integers, the pilot symbols comprising on the one hand symbols known as real pilot symbols, transmitted as symbols having a real value, and on the other hand symbols known as pure imaginary pilot symbols, transmitted as symbols having a pure imaginary value, comprising:

means for selecting one or more values $z_k$ of the signal received corresponding to one or more real pilot symbols of respective values $c_k$ on the one hand, and one or more values $z_l$ of the signal received corresponding respectively to one or more pure imaginary pilot symbols of respective values $c_l$ on the other hand, these pilot symbols being sufficiently close together both along the frequency axis and along the time axis for it to be possible to consider that the fading of the signal through the transmission channel has had a substantially identical complex value α for these pilot symbols; and means for determining an estimated value $\hat{\alpha}$ of the fading of the signal through the transmission channel for the pilot symbols concerned, which value is defined by $\hat{\alpha} = \rho \cdot e^{i\phi}$ where ρ and φ are real numbers which minimize the following least squares expression:

$$\varepsilon_3^2 = \sum_k \|\text{Re}(z_k \cdot e^{-i\varphi}) - \rho \cdot c_k\|^2 + \sum_l \|\text{Im}(z_l \cdot e^{-i\varphi}) - \rho \cdot c_l\|^2$$

where the sign Σ denotes the summation operator, where $\|x\|$ denotes the absolute value operator for the real variable x, where k is an integer index between 1 and the number of values $z_k$, here Re(x) denotes the real part operator for the complex variable x, and where Im(x) denotes the pure imaginary part operator for the complex variable x.

* * * * *